(12) United States Patent
Kniss

(10) Patent No.: US 7,281,739 B2
(45) Date of Patent: Oct. 16, 2007

(54) ADJUSTABLE MOUNT FOR VACUUM CUP WITH OFFSET MOUNTING POST AND SWIVEL

(75) Inventor: Jason M Kniss, Garden City, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/931,637

(22) Filed: Sep. 1, 2004

(65) Prior Publication Data

US 2006/0043747 A1    Mar. 2, 2006

(51) Int. Cl.
*B66C 1/02* (2006.01)
*B25J 15/06* (2006.01)

(52) U.S. Cl. .......................... 294/65; 294/907
(58) Field of Classification Search ............... 294/64.1, 294/65; 271/91, 103; 414/752.1
See application file for complete search history.

(56) References Cited

U.S. PATENT DOCUMENTS

| | | | | |
|---|---|---|---|---|
| 1,228,690 A | | 6/1917 | Monnet | |
| 2,389,480 A | * | 11/1945 | Baker | 271/92 |
| 2,850,279 A | | 9/1958 | Stoothoff et al. | 271/26 |
| 3,223,442 A | | 12/1965 | Fawdry et al. | 294/64 |
| 3,673,759 A | * | 7/1972 | Ayres et al. | 271/91 |
| 4,129,328 A | | 12/1978 | Littell | 294/65 |
| 4,266,905 A | | 5/1981 | Birk et al. | 414/627 |
| 4,600,228 A | | 7/1986 | Tarbuck | 294/64.1 |
| 4,662,668 A | | 5/1987 | Hufford | 294/64.1 |
| 4,747,634 A | | 5/1988 | Hoke | 294/64.1 |
| 4,957,318 A | * | 9/1990 | Blatt | 294/64.1 |
| 5,029,383 A | | 7/1991 | Snyder et al. | 29/740 |
| 5,172,922 A | | 12/1992 | Kowaleski et al. | 279/3 |
| 5,251,919 A | * | 10/1993 | Summers | 294/64.1 |
| 5,352,086 A | * | 10/1994 | Mank | 294/64.1 |

(Continued)

FOREIGN PATENT DOCUMENTS

JP      63-262350 A  * 10/1988 ................ 271/103

OTHER PUBLICATIONS

Bilsing Automation drawings for "Adapter for spring-mounted double blank detector", dated 2002.

(Continued)

*Primary Examiner*—Patrick Mackey
*Assistant Examiner*—Paul T Chin
(74) *Attorney, Agent, or Firm*—Van Dyke, Gardner, Linn & Burkhart, LLP

(57) ABSTRACT

A material handling device includes a vacuum cup pivotally attached to a receiving collar and pivotable to engage a surface of an object to be picked up by the material handling system. The receiving collar includes a support post and a mounting collar that is movable along the support post. The mounting collar is attachable to a support assembly that is movable to move the device toward and into engagement with the object. The mounting collar may move along the post after the respective cup engages the object and while the cups of other devices of the system are moved further toward and into engagement with the object. The material handling device may include an object sensor at a generally central region of the vacuum cup. The material handling device thus is configured to engage objects having uneven surfaces and having varying surface levels from one object to the next.

17 Claims, 9 Drawing Sheets

U.S. PATENT DOCUMENTS

| | | | |
|---|---|---|---|
| 5,609,377 A | 3/1997 | Tanaka | 294/65 |
| 5,622,362 A * | 4/1997 | Shiiki et al. | 271/91 |
| 5,676,364 A * | 10/1997 | Shiiki et al. | 271/91 |
| 6,345,818 B1 * | 2/2002 | Stephan et al. | 294/65 |
| 6,416,274 B2 * | 7/2002 | Tokuno | 294/64.1 |
| 6,454,333 B2 | 9/2002 | Portal | 294/64.1 |
| 6,502,877 B2 | 1/2003 | Schick et al. | 294/65 |
| 6,863,323 B2 * | 3/2005 | Neveu | 294/65 |

OTHER PUBLICATIONS

Syron website printout on "Double Blank Analyzer Systems", dated 1998.

Roland data sheet for "Double Sheet Detector R1000 Series E 10", Dec. 2001.

Roland P42 GS assembly, believed to be on sale more than one year prior to the filing date of the present application.

* cited by examiner

ADJUSTABLE MOUNT FOR VACUUM CUP WITH OFFSET MOUNTING POST AND SWIVEL

FIELD OF THE INVENTION

The present invention relates generally to material handling systems and, more particularly, to material handling systems that handle objects via vacuum cups or suction cups engaged with the objects and substantially sealed thereto.

BACKGROUND OF THE INVENTION

It is known to provide a material handling system that includes vacuum cups or the like that are adapted to be moved into engagement with an object, such as a substantially flat object or panel or the like, and to lift and move the object to a desired location. Such vacuum cups or suction cups may be moved into engagement with the object, and a vacuum source may be actuated to create a vacuum between the object and the cup such that the object is retained to the cup as it is transported to the targeted area. An example of such a vacuum cup is disclosed in U.S. Pat. No. 4,662,668, which is hereby incorporated herein by reference. The vacuum cup may include a proximity sensor that determines when the cup has engaged an object and that the object is positioned adjacent to the end of the proximity sensor.

Often, such material handling systems are used to move objects that may have different thicknesses from one end of the object to the next, such that as multiple objects are stacked on top of one another, the angle between the thinner sides and the thicker sides may increase as the stack height of the objects increases. A particular example of such an application is for automotive doors, where one end of the door may be a substantially flat piece of sheet metal, but the other end may have reinforcement metal or other structures, such as at the hinge area of the door. When a door is laid down in the assembly plant, the thicker hinged end of the door may be higher than the thinner opposite end of the door, and that difference in height (and thus of the surface angle of the door) may be increased as multiple doors are stacked upon one another in the same orientation. Accordingly, as each door is removed from the stack, the next lower door that is to be removed may be at a different angle than the one that was previously removed.

It has been proposed to accommodate such variations in the objects by providing a linear actuator or cylinder at each vacuum cup, such as disclosed in U.S. Pat. No. 4,129,328 issued to Littell. The cylinder may extend and retract to individually move the respective vacuum cup into engagement with the surface of the object. Although such a system may accommodate variations in the surface of the object, the system may include control circuitry and multiple actuators, which may add significantly to the cost and complexity of the system.

Therefore, there is a need in the art for a material handling system that engages and picks up and moves objects that have curved or angled or uneven surfaces and that overcomes the shortcomings of the prior art.

SUMMARY OF THE INVENTION

The present invention provides a material handling system that is operable to move two or more devices or vacuum cups into engagement with an object and to pick up and move the object to a targeted or desired location. The material handling system may move one of the devices or vacuum cups into engagement with the object, and may move a mounting collar of the device along a post as the system moves the other vacuum cup or cups further downward and into engagement with the object. The devices thus may adapt to varying surfaces and surface angles of the objects to be picked up, without requiring controls and independently actuatable cylinders and the like.

According to an aspect of the present invention, a material handling system for moving an object includes a support assembly and at least two material handling devices or cup assemblies. The support assembly supports and moves the material handling devices to engage and move an object. At least one of the material handling devices includes a vacuum cup attached to a swivel member and a receiving collar having an aperture for pivotally receiving the swivel member such that the vacuum cup is pivotally mounted to the receiving collar. A mounting collar is attached to a post extending from the receiving collar and is configured to attach to the support assembly such that movement of the support assembly moves the vacuum cup toward and into engagement with an object. The post is spaced from and generally parallel to a generally central axis of the aperture of the receiving collar.

When the support assembly moves one of the cups into engagement with an object, further movement of the support assembly toward the object moves the mounting collar along the post of the material handling device until the cup of the other material handling device or devices also engage the object. The material handling system is thus operable to engage and move an object having a non-level surface.

Optionally, the material handling device may include an object sensor or sensing device positioned at least partially through the vacuum cup, such as through a generally central region of the vacuum cup. In one form, the object sensing device may comprise a double blank detector, which may be operable to sense the thickness of the material or object that is picked up by the vacuum cup by sensing the thickness of the material at or substantially immediately adjacent to the sensor, in order to ensure that only one object or panel is picked up at a time. In another form, the object sensing device may comprise a proximity sensor, which may be operable to sense the proximity of the object at the vacuum cup, in order to determine if an object has been successfully retained by the vacuum cup as the material handling system lifts and moves the object.

The swivel member may comprise a partially spherical outer surface that slidably engages a correspondingly formed inner surface of the receiving collar. The outer surface of the swivel member may have a diameter that is substantially similar to the diameter of the perimeter seal of the vacuum cup that engages the object. The post may include a biasing member to bias or urge the mounting collar away from the receiving collar. The mounting collar may be movable or slidable along the post and against the biasing member. The biasing member may comprise a coil spring positioned at least substantially around or within the post.

According to another aspect of the present invention, a material handling device or cup assembly for engaging and moving an object includes a vacuum cup, an object sensor, a receiving collar and a mounting collar. A support assembly is configured to movably support the material handling device. The vacuum cup has an object engaging end or perimeter seal and is attached to a swivel member. The object sensor is positioned at least partially within the vacuum cup and directed generally toward the perimeter seal of the vacuum cup that engages the object. The receiving collar has an aperture for pivotally receiving the swivel member. The swivel member has an outer surface that slidably engages an inner surface of the receiving collar. The object sensor is positioned at or through the swivel member and radially inward of the outer surface of the swivel member. The outer surface of the swivel member has a diameter that may approach or may be substantially similar to a diameter of the perimeter seal of the vacuum cup. The receiving collar includes a post extending from the receiving collar and generally parallel to an axis defined by and through the receiving collar and generally normal to the receiving collar. The mounting collar is movably or slidably attached to the post and is configured to attach to the support assembly.

Movement of the support assembly moves the vacuum cup toward and into engagement with an object. The mounting collar is movable or slidable along the post by the support assembly after the vacuum cup is at least partially engaged with the object. The material handling device is thus movable to engage and move an object having an uneven or angled surface.

The object sensor may comprise a proximity sensor, which is operable to sense the proximity of the object as the vacuum cup and the object sensor are moved toward and into engagement with the object, or may comprise a double blank detector, which is operable to sense the thickness of the material of the object at the vacuum cup to ensure that only one object or panel is picked up by the vacuum cup at a time.

According to another aspect of the present invention, a method of engaging and moving an object includes providing a material handling system having a movable support assembly that supports at least two material handling devices or cup assemblies. Each cup assembly comprises a cup (such as a vacuum or suction cup), a post, and a mounting collar. At least one of the cup assemblies comprises a pivotable cup assembly having a swivel member, a receiving collar, and an object sensor. The vacuum cup of the pivotable cup assembly is attached to the swivel member. The receiving collar has an aperture for pivotally receiving the swivel member such that the vacuum cup is pivotally mounted to the receiving collar. The post extends from the receiving collar and is spaced from a generally central axis of the aperture of the receiving collar. The mounting collars of the cup assemblies are movably mounted to the respective posts. The support assembly is attached to the mounting collars and is moved to move the cup assemblies until the cup of a first cup assembly engages the object. The support assembly is moved further until the cup of a second cup assembly engages the object. The mounting collar of the first cup assembly moves along the post toward the cup while the support assembly moves to move the second cup assembly into engagement with the object. The support assembly is moved to lift the object and to move the object to a targeted location while the object is held by the vacuum cups of the cup assemblies.

The proximity or thickness of an object at the cup of the pivotable cup assembly may be sensed via an object sensor positioned at a generally central region of the cup of the pivotable cup assembly. The swivel member may have a diameter that is substantially similar to the diameter of the perimeter seal of the cup of the pivotable cup assembly. The swivel joint, or the opposing surfaces of the swivel member and receiving collar, may be substantially near to or in close proximity with the perimeter seal of the cup of the pivotable cup assembly, such that the pivot axis is generally at or near to the vacuum cup and spaced a relatively short distance above the perimeter seal of the vacuum cup. Such a configuration limits or substantially precludes tipping or tilting of the vacuum cup of the material handling device away from the object as it is moved toward and into engagement with the object. Preferably, the pivot axis is within a distance from the perimeter seal that is less than the radius of the perimeter seal of the vacuum cup.

Therefore, the present invention provides a material handling system that moves multiple material handling devices and vacuum cups into engagement with an object. The object surface may be oriented at an angle or tilt, such that one of the vacuum cups may engage the object before the other vacuum cup engages the object. The material handling system may move the other material handling device and vacuum cup further and into engagement with the object while the mounting collar of the first material handling device is correspondingly moved or slid along the post of the first material handling device. The material handling system and devices of the present invention thus may engage and move objects with varying surfaces without requiring independently operable cylinders and the like.

By urging and moving the vacuum cup via attachment around a perimeter of the vacuum cup and in close proximity to the vacuum cup, the receiving collar of the support assembly of the present invention provides enhanced sealing of the vacuum cup to the object surface. Such a mounting arrangement limits or substantially precludes tipping or tilting of the vacuum cup of the material handling device away from the object as the vacuum cup is moved into engagement with an angled surface. As the vacuum cup of the material handling device of the present invention is moved into engagement with an object surface, the vacuum cup and perimeter seal pivot about an axis through the receiving collar to align with the angled surface. The pivot axis is generally at or near to the vacuum cup and spaced a relatively short distance above the perimeter seal of the vacuum cup, so that tipping or tilting of the vacuum cup away from the object is limited or substantially precluded. Also, by providing the support post at the receiving collar in a location that is spaced from a generally central axis of the aperture in the receiving collar, the cup assembly of the present invention provides space for the object sensor to be positioned at the generally central region of the vacuum cup and receiving collar, while providing enhanced pivotal movement of the vacuum cup and swivel member relative to the receiving collar and post.

These and other objects, advantages, purposes and features of the present invention will become apparent upon review of the following specification in conjunction with the drawings.

DESCRIPTION OF THE PREFERRED EMBODIMENTS

Figure 1:
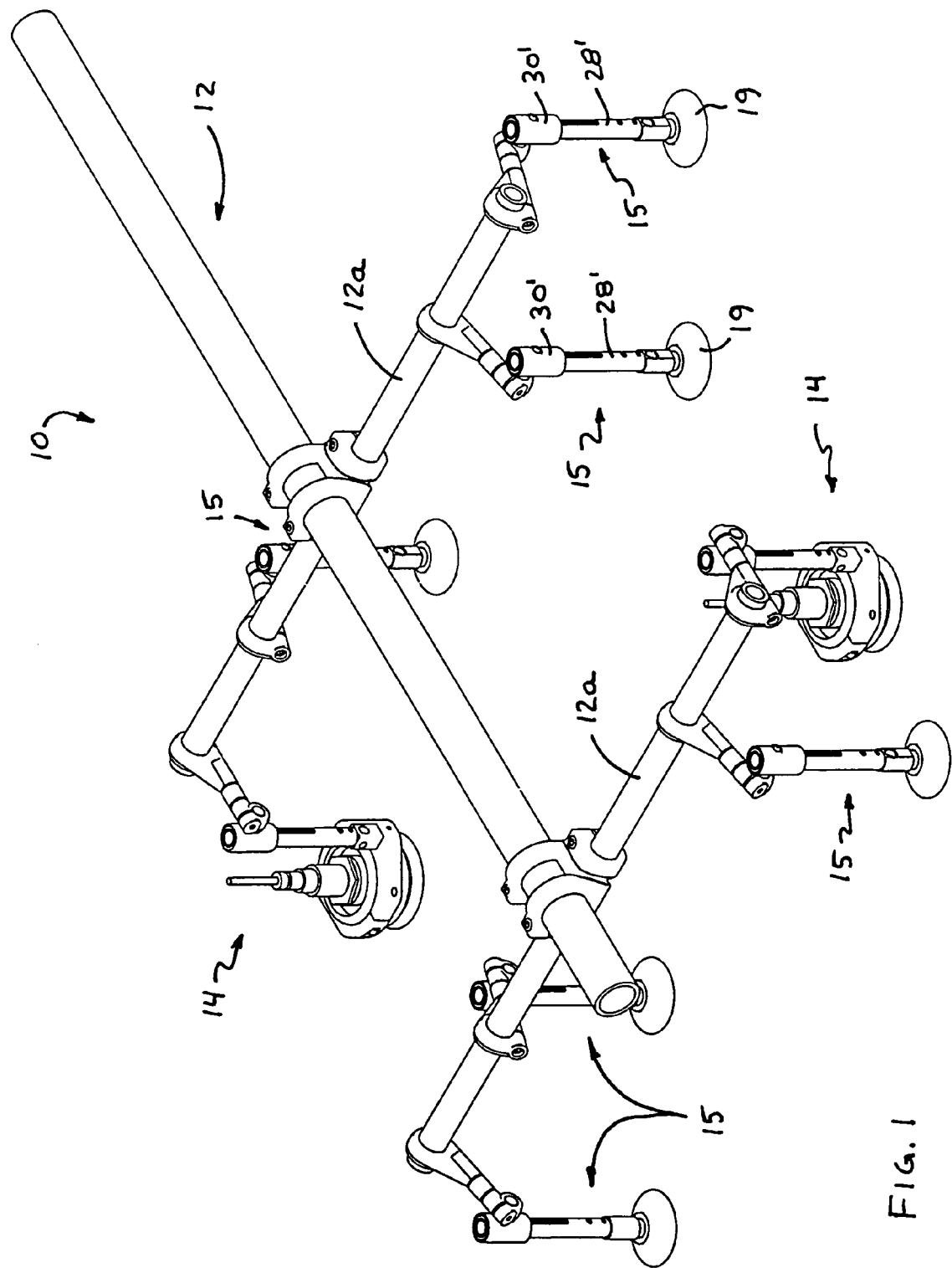
FIG. 1 is a perspective view of a material handling system in accordance with the present invention.

Referring now to the drawings and the illustrative embodiments depicted therein, a material handling system 10 includes a support assembly 12 that is operable to move and support a plurality of vacuum cup assemblies or material handling devices or assemblies or destackers 14, 15 (FIG. 1). Support assembly 12 is movable or adjustable or controllable to move the material handling devices 14, 15 into engagement with an object 16, where the vacuum cups 18, 19 of material handling devices 14, 15 may engage and seal to the object for picking up and moving the object 16. Material handling system 10 may include a vacuum source (not shown) for providing a vacuum at each of the vacuum cups 18 to substantially vacuum seal the vacuum cups 18 to the object 16. The material handling devices 14 provide adjustable mounts that allow the respective vacuum cups 18 to be independently pivoted and moved into engagement with an angled surface of the object via movement of the support assembly 12, as discussed below.

As best shown in FIGS. 5-8, each material handling device 14 includes a vacuum cup 18 and an object sensor 22 mounted to a swivel member or ring 24. The material handling device 14 may be a pivotable cup assembly or material handling device whereby the swivel member 24 is pivotally received within a respective receiving collar or ring 26. The vacuum cup and object sensor and swivel member thus may pivot relative to the receiving collar (such as about a plurality of generally horizontal pivot axes) to align the vacuum cup 18 with a generally non-horizontal or angled surface of an object, while the receiving collar 26 may be held generally horizontal by the support assembly 12, such as can be seen with reference to FIGS. 2-4 and as discussed below. Material handling device 14 includes a post or mount 28 extending generally vertically upward from receiving collar 26 (when receiving collar 26 is generally horizontal). A mounting collar or member or movable or slidable collar or member 30 may be movable or slidable along post 28 and may attach or mount the material handling device 14 to a movable support arm 12a of support assembly 12. Support arm 12a may attach to and move multiple material handling devices 14, 15 into engagement with the object to be picked up and moved by the material handling system. The mounting collar 30 may move or slide along the generally vertical post 28 after the respective vacuum cup is engaged with the object and while the support arm is moved further downward to move the other vacuum cup or cups into engagement with the object, as discussed below.

Figure 2:
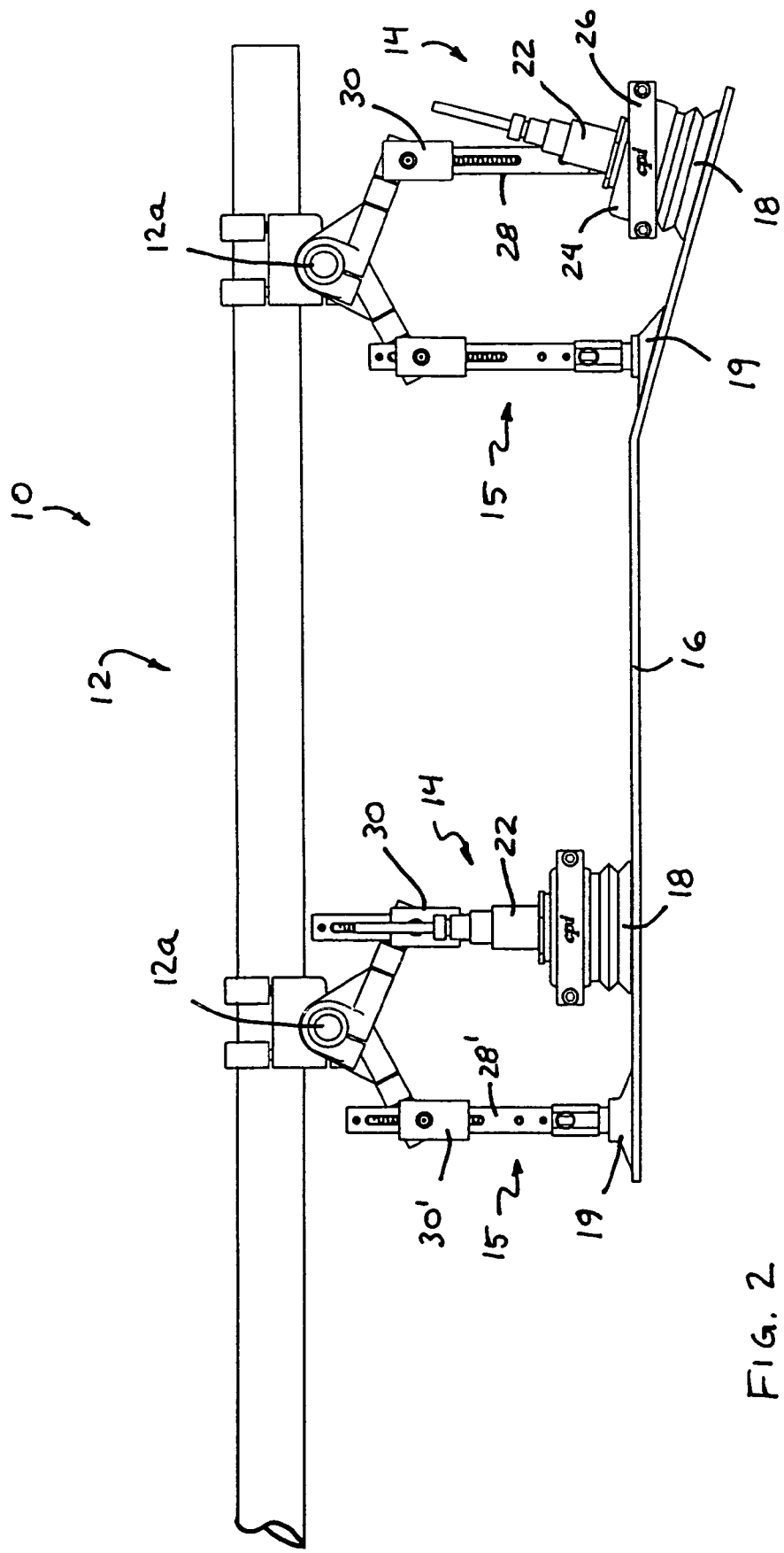
FIG. 2 is a side elevation of the material handling system of FIG. 1.

As shown in FIGS. 1 and 2, material handling devices 15 also include a mounting collar 30' that may be movable or slidable along a support post 28' that extends upward from the vacuum cup 19. The support arm or arms 12a thus may move generally vertically and substantially together or in generally the same plane, while the vacuum cups may individually engage the surface of the object. The support post 28' and vacuum cup 19 may be moved to engage the vacuum cup with the object, whereby the vacuum cup may flex to generally or at least partially adapt to the surface of the object, as can be seen in FIG. 2. The vacuum cups may be connected to the vacuum source to provide suction or vacuum at the cups to substantially retain the object at the cups.

Figure 6:
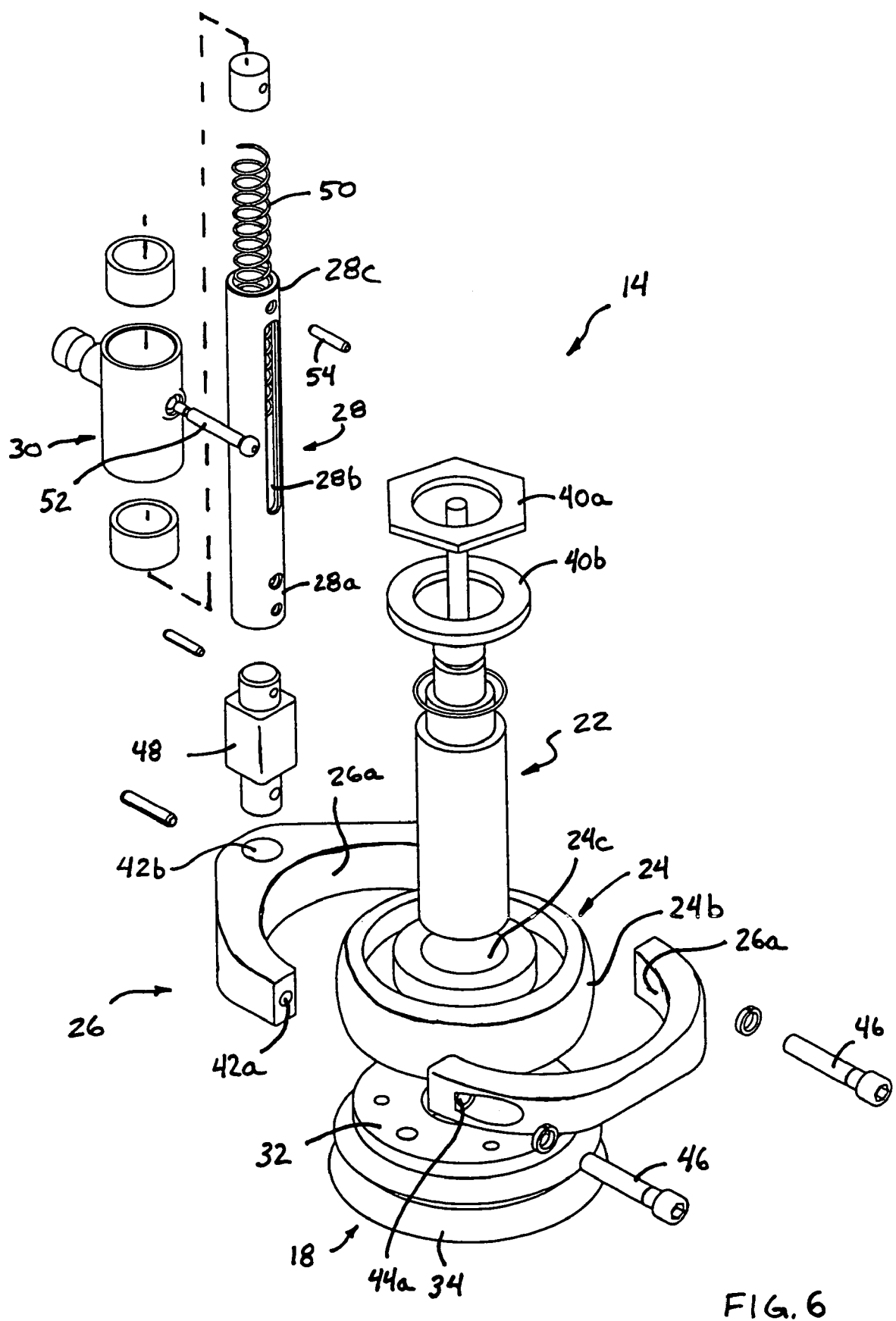
FIG. 6 is an exploded perspective view of the material handling device of FIG. 5.
Figure 7:
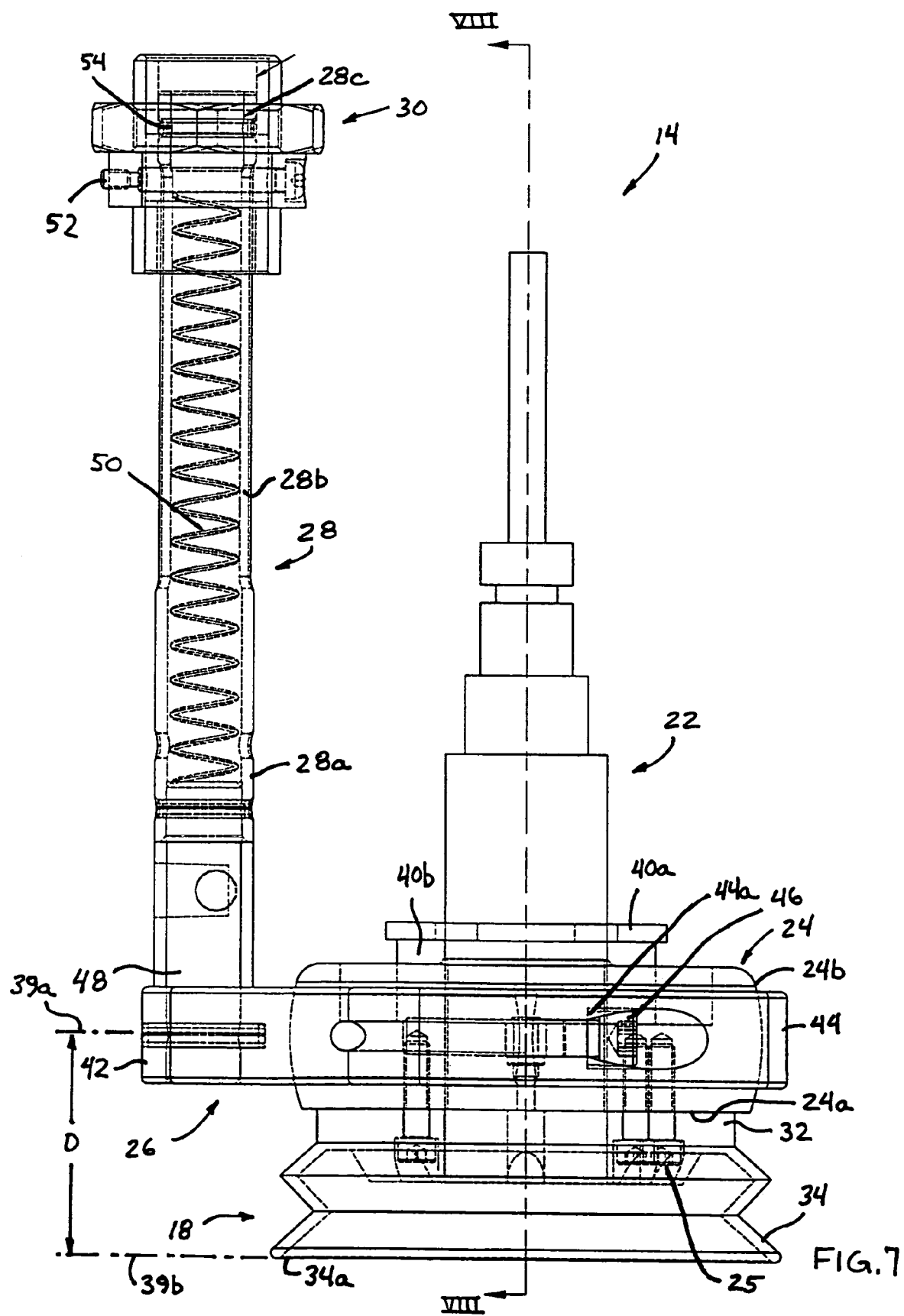
FIG. 7 is a side elevation of the material handling device of FIGS. 5 and 6.
Figure 8:
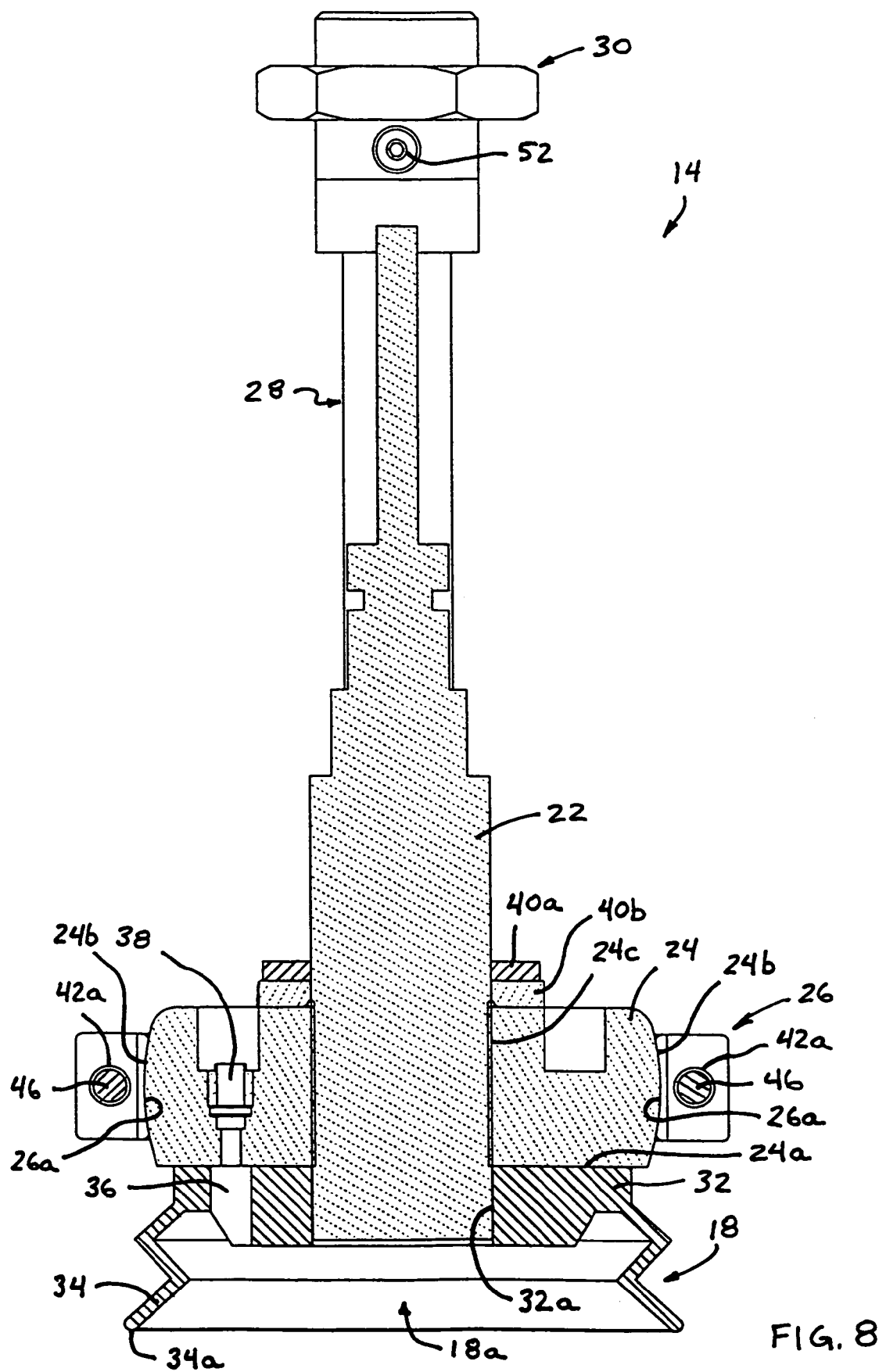
FIG. 8 is a sectional view of the material handling device taken along the line VIII-VIII in FIG. 7.

As best shown in FIGS. 6-8, vacuum cup 18 of material handling device 14 includes a body portion 32 and a perimeter seal portion 34. Vacuum cup 18 includes a vacuum port 36 which provides a passageway for drawing air out of a cavity 18a defined by the body portion 32 and perimeter seal 34 and the surface of the object that is engaged with an engaging end 34a of the perimeter seal 34. Vacuum cup 18 may be connected to and/or in fluid communication with the vacuum source, such as via a tube or hose or the like (not shown) connecting to the vacuum port 36 (or to the vacuum port 38 of swivel member 24 as discussed below). The vacuum source may be operable to draw air from cavity 18a through vacuum port 36 to at least partially evacuate the air from the cavity and create a partial or substantial vacuum in cavity 18a, so as to substantially seal and retain the object to vacuum cup 18.

Vacuum cup 18 may be integrally or unitarily molded from an elastomeric material or may be otherwise formed or molded, without affecting the scope of the present invention. Although shown as a vacuum cup having a bellows style or accordion style perimeter seal 34, it is envisioned that the vacuum cup may have other seal portions (such as a tapered perimeter seal portion or the like, and/or such as a seal portion of the types described in U.S. provisional application, Ser. No. 60/541,636, filed Feb. 4, 2004 by Attee et al. for VACUUM CUP FOR DESTACKER, which is hereby incorporated herein by reference), and/or other types of vacuum cups may be implemented with the material handling device, without affecting the scope of the present invention.

Vacuum cup 18 may be attached to or adhered to or molded to or fastened to or otherwise secured to a lower surface or portion 24a of swivel member 24 (such as via a plurality of fasteners or bolts 25 as shown in FIG. 7). As shown in FIGS. 7 and 8, swivel member 24 includes a vacuum port 38, such that the vacuum hose or tube or the like may connect thereto, whereby actuation of the vacuum source will draw air out of the cavity of the vacuum cup and through the vacuum ports 36, 38, as discussed above. As can be seen in FIGS. 6-8, swivel member 24 comprises a generally disc-shaped member having an outer surface 24b that is generally a partial spherical shape to facilitate pivotal movement of swivel member 24 relative to receiving collar 26, as discussed below. As can also be seen in FIGS. 3, 4, 7 and 8, the diameter of swivel member 24 may be generally about the same as the diameter of the vacuum cup perimeter seal 34. This allows the vacuum cup 18 to be readily moved and pivoted into full engagement with the object surface by the support assembly and receiving collar 26.

The swivel member 24 and collar 26 define a swivel joint that is close to or in close proximity to the engaging end or lip 34a of perimeter seal 34. As shown in FIG. 7, a separation distance or space D between a plane 39a generally through the middle of the swivel member 24 of the swivel joint and a plane 39b at the engaging lip 34a is less than or roughly or approximately the same as the radius of the engaging lip of the perimeter seal 34 (such as a little less than the radius, such as approximately ¼ or ½ of an inch or thereabouts less than the radius of the engaging lip). The proximity or separation distance of the swivel joint or swivel member and the perimeter seal thus may be selected based on the size or diameter of the perimeter seal and may vary depending on the size or diameter of the perimeter seal. The close proximity of the swivel joint to the engaging lip of the perimeter seal allows the vacuum cup to readily pivot into alignment and engagement with an object as the vacuum cup is moved toward and into engagement with the object.

The large diameter swivel member or pivot joint at the vacuum cup thus allows the vacuum cup to readily pivot about the pivot axis or axes to substantially uniformly engage the object surface and, thus, to substantially uniformly engage the perimeter seal of the vacuum cup to the surface of the object. Also, because the swivel member is generally at or near the vacuum cup seal, the vacuum cup assembly provides the pivot axis or axes near to or in close proximity with the perimeter seal, so that the vacuum cup may readily pivot about the low or close pivot axis or axes as it is moved toward and into engagement with the object surface. The swivel joint and vacuum cup of the present invention thus limits or substantially precludes pivoting or tilting of the vacuum cup away from the object surface as the vacuum cup is moved toward and into engagement with the object surface.

Figure 3:
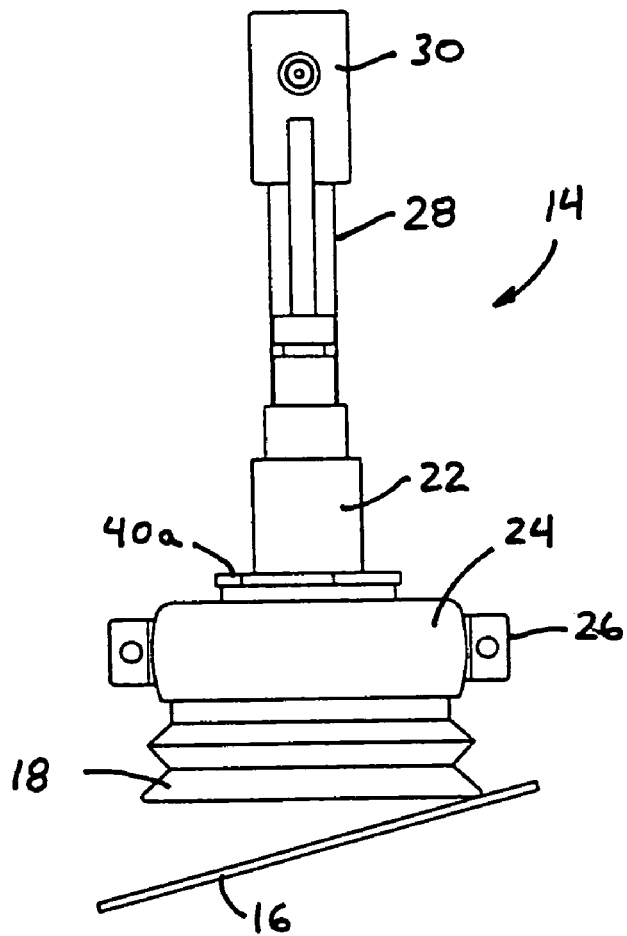
FIG. 3 is a side elevation of a material handling device of the present invention as it approaches and first engages an object.
Figure 4:
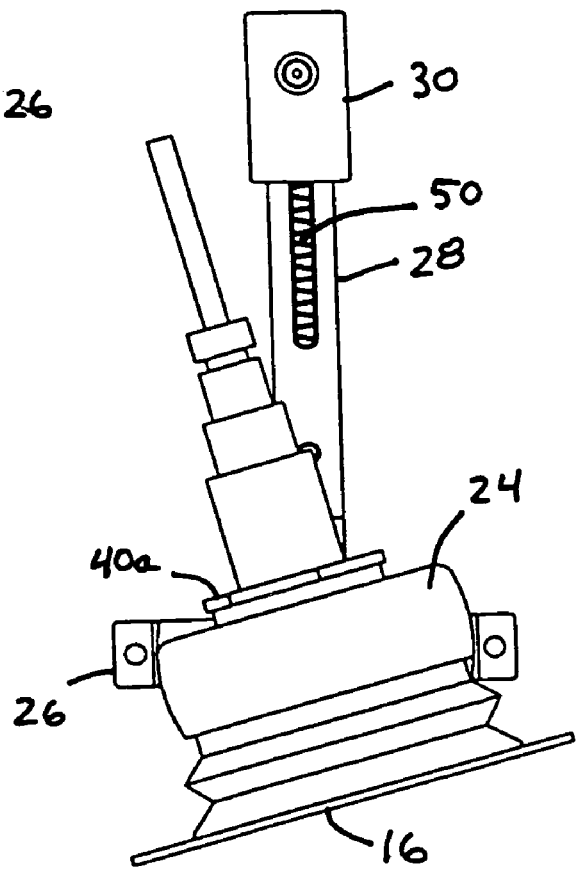
FIG. 4 is a side elevation of the material handling device as the cup pivots to fully engage the object.
Figure 5:
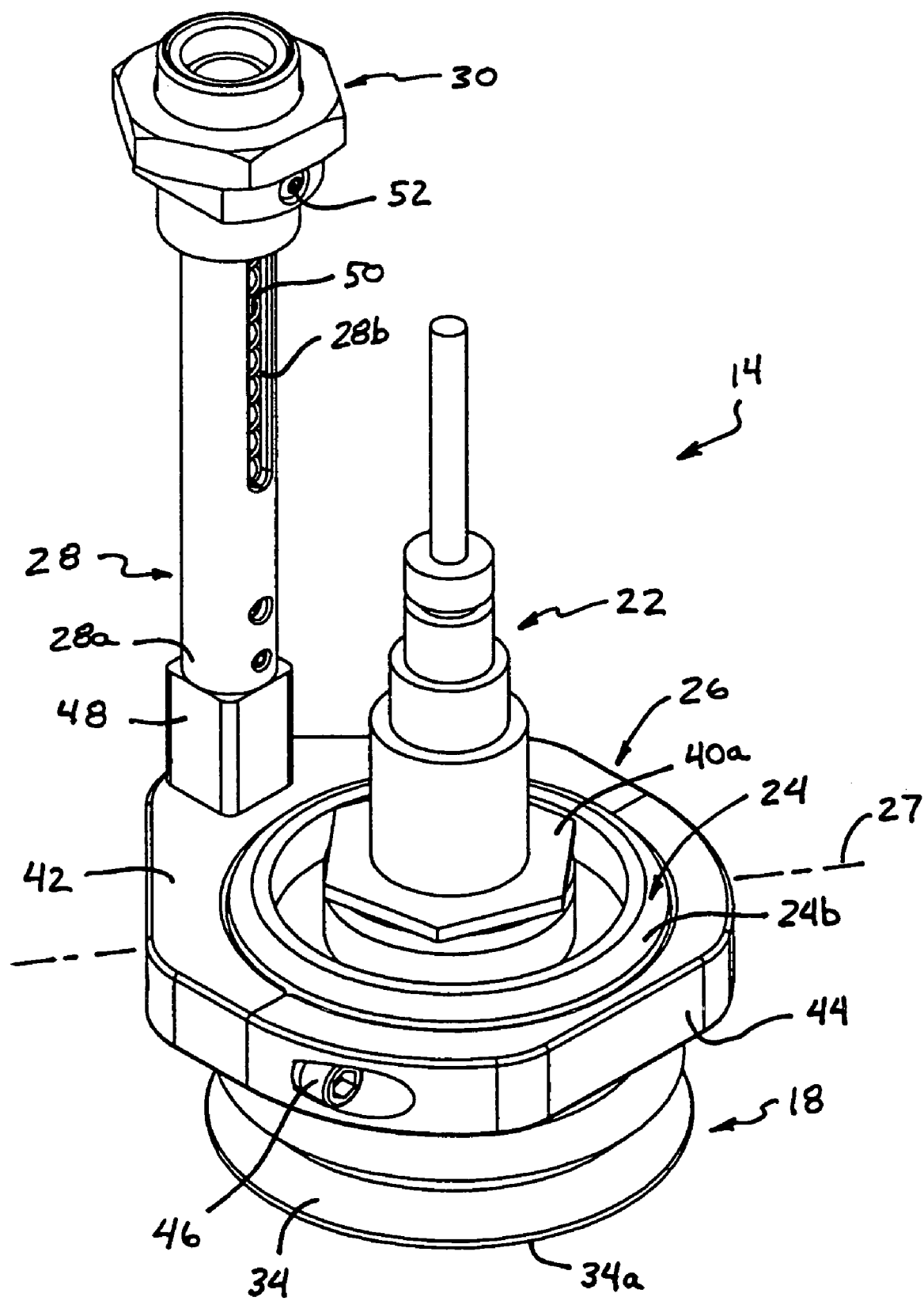
FIG. 5 is a perspective view of a material handling device of the present invention.

The pivotal movement of the vacuum cup about the pivot axis at the receiving collar is shown in FIGS. 3 and 4. As shown in FIG. 3, an edge or region or end of the perimeter seal may initially contact a portion of the object surface when the vacuum cup is first moved toward and into engagement with the object. As the vacuum cup is moved further toward the object, the vacuum cup may readily pivot about the axis at the receiving collar to substantially align the perimeter seal of the vacuum cup with the object surface (as shown in FIG. 4). The larger diameter receiving collar and the closeness or proximity of the pivot axis/axes to the vacuum cup and perimeter seal (and thus to the object surface) allows the vacuum cup to readily pivot into alignment with the object surface as the vacuum cup is moved toward and into engagement with the object surface.

Figure 9:
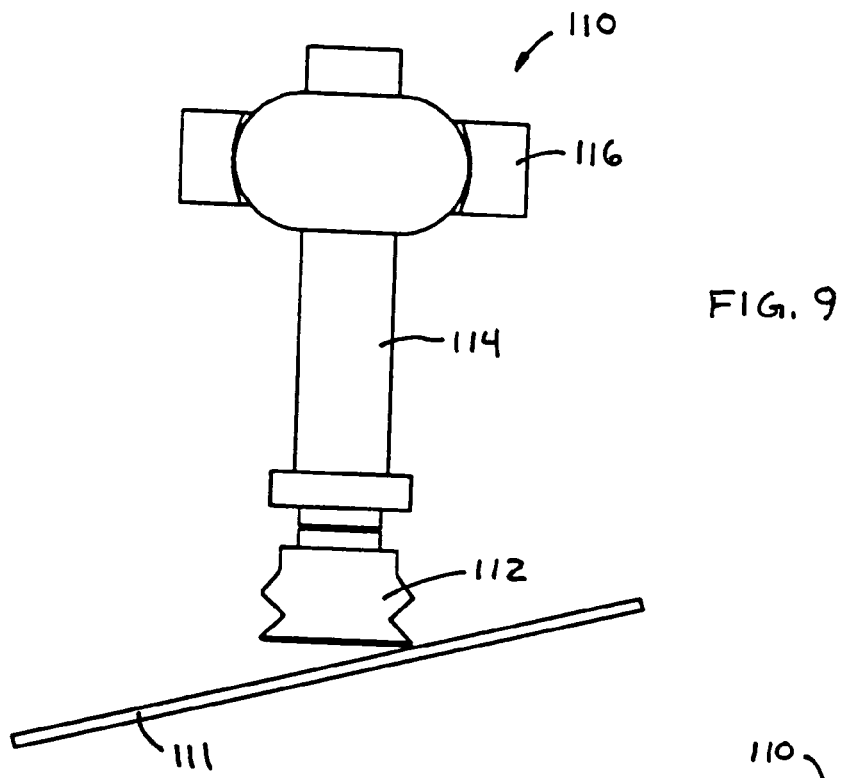
FIG. 9 is a side elevation of another vacuum cup as it approaches and first contacts an object.
Figure 10:
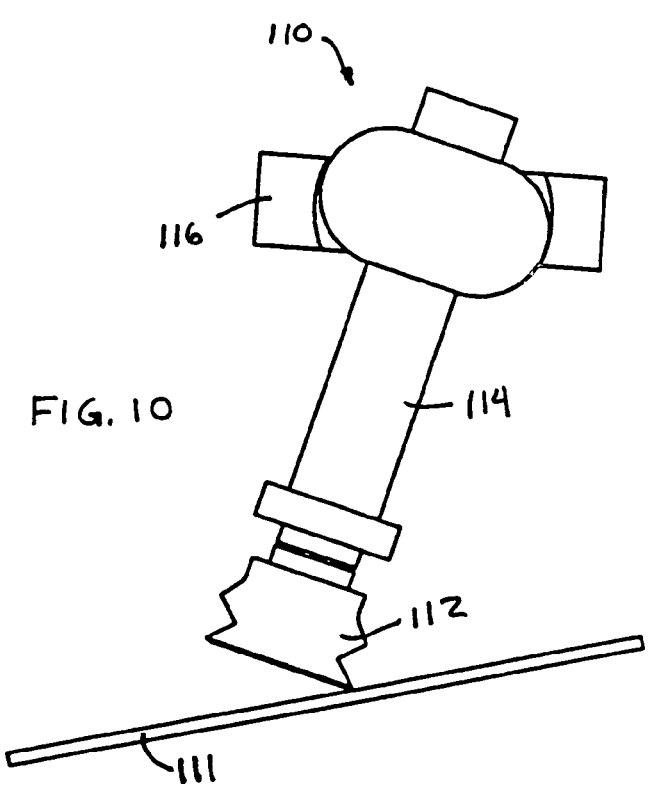
FIG. 10 is a side elevation of the vacuum cup of FIG. 9 as the cup device pivots or tilts as the cup is moved further toward the object.

The receiving collar and vacuum cup arrangement of the present invention thus provides enhanced sealing of the vacuum cup to the surface of an object. If the pivot axis of the vacuum cup assembly were remote from the vacuum cup (as is done with many known or conventional vacuum cup assemblies), the vacuum cup may pivot or tilt away from the object surface as the vacuum cup is moved toward and into engagement with the object surface. For example, and with reference to FIGS. 9 and 10, a vacuum cup assembly 110 is shown and includes a vacuum cup 112 and a support shaft 114, which is pivotally mounted at a mounting collar 116. The mounting collar 116 is positioned at an upper end of the support shaft 114, while the vacuum cup 112 is mounted at a lower end of the support shaft 114. The support shaft 114 is generally vertically oriented and the vacuum cup 112 is generally horizontally oriented as the vacuum cup first engages the angled surface of an object 111 (as shown in FIG. 9). As the vacuum cup and support shaft are moved further into engagement with the object surface, the vacuum cup 112 and support shaft 114 may pivot about an axis defined at the mounting collar 116, and thus may tilt such that the vacuum cup pivots away from the object surface (as shown in FIG. 10). By positioning the pivot joint between the vacuum cup and the support post at or near to the vacuum cup, the vacuum cup assembly of the present invention avoids or substantially precludes tilting or pivoting of the vacuum cup away from the object surface as the vacuum cup is moved toward and into engagement with the object surface.

Body portion 32 of vacuum cup 18 of material handling device 14 may have an aperture 32a therethrough, while swivel member 24 may also have a generally corresponding aperture 24c therethrough, for receiving object sensor 22. Object sensor 22 thus may be positioned through a generally central region of swivel member 24 and may be partially within vacuum cup 18 and directed generally toward the engaging end 34a of perimeter seal 34 of vacuum cup 18. The object sensor may comprise a threaded sensor and may be inserted a desired amount or distance into body portion 32 and may be retained in position via a fastener or nut 40a and washer 40b.

Optionally, the object sensor 22 may comprise a double blank detector or sensor that is operable to detect the thickness of the material of the object at the vacuum cup to ensure that only one object or panel is picked up by the vacuum cup. Such thickness sensors or double blank detectors are known in the art of material handling systems. The vacuum cup body portion may receive the double blank detector and may retain the detector therein so that the sensing end of the detector is positioned at a level that is substantially near to the location of an object secured to the vacuum cup during operation of the material handling system. The double blank detector may be retained in this position with its sensing end generally parallel to and in close proximity to the surface of the held object, so that the double blank detector may provide a substantially accurate estimation or determination of the thickness of the object that is picked up and held by the vacuum cup. The double blank detector may be calibrated to the thickness of the object or panel to determine if the picked up object is within the desired thickness tolerances and thus is indicative of a single object or panel. If the thickness is beyond the specified or calibrated thickness, the larger thickness may be indicative of two objects or panels stuck together, whereby a signal may be generated to alert the system or an operator so that the problem may be corrected.

Optionally, the object sensor 22 may comprise a proximity sensor that is operable to detect the presence of an object or item at the vacuum cup, in order to determine if the vacuum cup is fully engaged with the object and if the object is properly retained by the vacuum cups as the system moves the devices 14, 15 to lift and move the object. The proximity sensor may comprise any suitable type of sensing device, and may comprise a sensing device of the type described in U.S. Pat. No. 4,662,668, which is hereby incorporated herein by reference.

In applications such as shown in FIG. 1, where multiple vacuum cup assemblies are used to pick up an object or panel, one or more of the material handling devices or vacuum cup assemblies 14 may include a double blank detector, while one or more other such devices or assemblies may include a proximity sensor. For example, one of the vacuum cup assemblies 14 in FIG. 1 may include a double blank detector while the other vacuum cup assembly 14 may include a proximity sensor. Alternately, each may include a proximity sensor and/or a double blank detector, without affecting the scope of the present invention.

Receiving collar 26 may comprise curved or semi-circular opposite end portions 42, 44, which may be joined together to form the generally circular receiving collar 26. Each of the end portions 42, 44 is substantially a semi-circle and defines a respective semi-circular inner curved surface 26a that is formed in a partial spherical shape to correspond to the shape of the outer surface 24b of the swivel member 24. The end portions 42, 44 may be assembled together around the swivel member (as shown in FIG. 6) to pivotally secure the swivel member 24 within the receiving collar 26. As best shown in FIG. 6, the end portions 42, 44 may have opposed ends with apertures or bores 44*a* through the ends of one end portion 44 and a threaded aperture or passageway 42*a* in the ends of the other end portion 42. Threaded fasteners or bolts 46 may be threaded through the respective apertures 44*a*, 42*a* to secure the end portions together around the swivel member 24. Other means for securing or retaining the collar around the swivel member may be implemented, without affecting the scope of the present invention.

Receiving collar 26 thus may pivotally receive swivel member 24 therein, such that swivel member 24 may pivot relative to receiving collar 26 to adjust an angle or tilt of the vacuum cup for engagement with the object surface, as discussed below. As can be seen in FIGS. 7 and 8, the swivel member and the receiving collar have correspondingly formed partial spherical surfaces, such that the opposing surfaces allow pivotal movement of the swivel member (and vacuum cup and object sensor) relative to the receiving collar and about a plurality of generally horizontal pivot axes. In other words, the swivel member may be pivoted about any axis defined generally by a diametrical line through the swivel member, similar to a ball and socket type of mounting arrangement. For example, the swivel member may pivot relative to the receiving collar about the diametrical pivot axis shown generally at 27 in FIG. 5 or about any other similarly defined pivot axis. The diameters of the opposing surfaces of the swivel member and receiving collar are large enough to provide space at the central region of the vacuum cup and swivel member for the object sensor and may approach or be substantially similar to or near to the diameter of the perimeter seal of the vacuum cup.

As best shown in FIGS. 5-8, end portion 42 of receiving collar 26 may also include or receive or attach to an attachment 48 for attaching post 28 to receiving collar 26. One end of attachment 48 may be received and secured in an aperture 42*b* in end portion 42, while the other end of attachment 48 may be received and secured in a lower end 28*a* of post 28, such that post 28 extends generally vertically upwardly from receiving collar 26 when receiving collar 26 is generally horizontal (in other words, post 28 is generally perpendicular or normal to the receiving collar 26).

Support post 28 may comprise a generally cylindrical, hollow tube that is received within and through mounting collar 30. As can be seen in FIGS. 5-8, post 28 may include a biasing member or spring 50 within the post or tube to bias or urge the mounting collar 30 along post 28 and away from receiving collar 26 and vacuum cup 18. In the illustrated embodiment, mounting collar 30 may include a pin 52 that may be inserted through mounting collar 30 and through post 28 and that may attach to or engage an upper end of the biasing member or spring 50. As can be seen with reference to FIGS. 5-8, pin 52 may insert through and slide along slots 28*b* extending along opposite sides of the post or tube 28 as the mounting member or collar 30 is moved along post 28. Another pin 54 may be provided through an aperture in an upper end 28*c* of post 28 to limit upward movement of mounting collar 30 along post 28.

Figure 11:
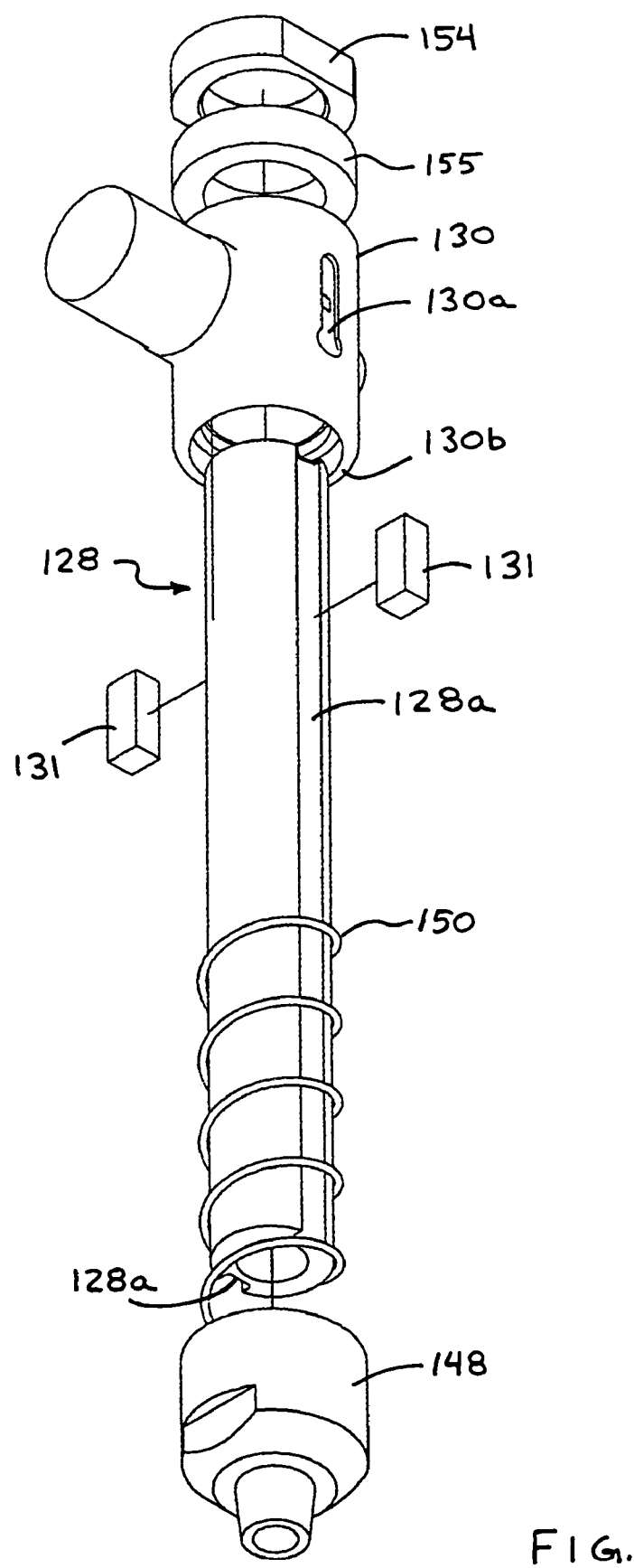
FIG. 11 is an exploded perspective view of another support post and mounting collar in accordance with the present invention.

Optionally, and with reference to FIG. 11, a support post 128 for movably mounting to a mounting collar 130 and for mounting to the receiving collar (not shown in FIG. 11) may include a biasing member or spring 150 generally around the post or tube to bias or urge the mounting collar 130 along post 128 and away from the receiving collar and vacuum cup. Support post 128 may include one or more channels or grooves or keyways 128*a* extending at least partially along its outer surface for receiving guide members 131 therein.

The guide members 131 may be received within slots 130*a* of mounting collar 130 and within grooves 128*a* to limit or substantially preclude rotation of support post 128 relative to mounting collar 130. Mounting collar 130 may move or slide along support post 128, and may compress the spring 150 around the support post 128 via the lower lip or surface 130*b* of mounting collar 130, as the support assembly moves the vacuum cups into engagement with the object. As shown in FIG. 11, an attachment portion 148 may be secured to the lower end of support post 128 (such as via threaded engagement), and may be secured to the receiving collar (such as via threaded engagement with aperture or port 42*b* of receiving collar 26) to attach the post 128 to the receiving collar. A stop collar 154 and stop member 155 (such as an elastomeric member or urethane or rubber member or the like) may be attached at the upper end of the support post 128 to limit upward movement of the mounting collar 130 along support post 128. The support post 128 and operation thereof is otherwise substantially similar to the support post 28, such that a detailed description of the support posts will not be repeated herein.

Mounting collars 30, 30', 130 may be configured to mount to or secure to or attach to a portion of the support arm 12*a* of support assembly 12, such as via any attachment means or the like. When mounting collars 30, 30', 130 are attached to the support assembly 12 movement of the support assembly correspondingly moves the mounting collars 30, 30', 130 and, thus, the respective material handling devices 14, 15. The biasing member or spring 50, 150 urges the mounting collars 30, 30', 130 toward the upper ends 28*c* of the respective posts 28, 28', 128, such that mounting collars 30, 30', 130 remain generally at the upper end of the post during movement of the support assembly and material handling device toward an object.

During use, the movable support arm or arms may connect to the mounting collars of multiple material handling devices or assemblies 14, 15, and may move the multiple devices downward into engagement with different areas of the object to be picked up and moved by the material handling system. Because the object may not be horizontal or level, and may be at varying angles depending on how many objects are in the stack of objects, the support arm may move downward until a vacuum cup of a first one of the devices engages a respective area of the object (and may pivot to generally uniformly engage the surface of the object at the respective area). Further movement of the support arm toward the object causes the vacuum cups of at least some of the other devices to be moved into engagement with other areas of the object, while the mounting collar of the first device may move or slide downward along the support post against the biasing member and toward the respective vacuum cup. The mounting collar thus may move or slide along the vertical support post and compress the internal spring within the vertical post (or the external spring around the post or other biasing member or members otherwise arranged along the post) as the support assembly moves or lowers the other vacuum cups into engagement with the object.

As the vacuum cup of each of the pivotable vacuum cup assemblies or material handling devices 14 is moved toward and into engagement with the object, the swivel member and receiving collar cooperate to allow the vacuum cup and the object sensor to pivot in substantially any direction to align with the face or surface of the object as the assembly is moved downward into engagement with the object. Because the swivel member and the receiving collar have correspondingly formed partial spherical surfaces, the surfaces allow pivotal movement of the swivel member (and vacuum cup and object sensor) relative to the receiving collar and about a plurality of generally horizontal pivot axes (or in other words, about any axis defined generally by a diametrical line through the swivel member). Because the diameter of the swivel member may be generally about the same as the diameter of the vacuum cup perimeter seal and because the pivot axis or axes may be positioned in close proximity to the vacuum cup and perimeter seal (such as within a distance that is less than or approximately equal to the radius of the perimeter seal), the vacuum cup may be moved toward and into engagement with the object surface and may be readily pivoted into full engagement with the object surface as the support assembly and receiving collar are moved further toward the object surface. The vacuum cups of the pivotable cup assemblies or material handling devices thus may readily adapt to the surface angle of the object as they are moved toward and into engagement with the object surface. This reduces the possibility of misalignment or non-uniform sealing of the vacuum cups on the object surface, which enhances the sealing and effectiveness of the material handling devices.

Also, by providing the swivel attachment around the central region of the vacuum cup, the material handling device may include the object sensor at the generally central region while still providing pivotal movement of the vacuum cup relative to the support post. Although shown as being generally at the center axis of the vacuum cup, the object sensor may be offset from the center axis, yet still at or through the generally central region of the vacuum cup and the swivel member and thus radially inward of the opposing surfaces or pivot joint of the swivel member and receiving collar.

When at least some, if not all, of the vacuum cups have engaged the object and the vacuum source has substantially sealed the vacuum cups at the object surface (as may be detected by the object sensors at some of the material handling devices), the support assembly may raise the object and move or transport the object to the desired or targeted destination. When the object is raised, the double blank detector or detectors may determine whether the thickness of the object held by the device is indicative of a single object or panel, and an alert signal may be generated if such thickness is indicative of two or more objects or panels stuck together. When the object is generally at the targeted destination location or station, the material handling system may release the object. For example, the object may be stripped from the cups, or the vacuum source may be deactivated or the object may be otherwise detached from the vacuum cups to release the object at the destination, without affecting the scope of the present invention. After the object has been released or stripped or detached from the vacuum cups, the material handling system may move the material handling devices back to the stack of objects to pick up the next object.

Therefore, the vacuum cups of the material handling devices of the present invention may readily pivot to any appropriate angle, such that the material handling system may engage and pick up objects that may have surfaces at different angles from one object to the next. Also, the vertical mounting post and sliding mounting collar allow the vacuum cup and object sensor assembly to move downward different amounts relative to the other assemblies as the movable support arm or linkage moves the assemblies into engagement with the object, in order to adapt the multiple assemblies to engage objects that may have varying height differentials from one end to the other. The material handling device or assembly of the present invention thus may accommodate varying angles of the surfaces of the objects or panels by providing a pivotable vacuum cup assembly and a sliding attachment to the vacuum cup assembly. The pivot joint of the vacuum cup assembly allows the vacuum cup to readily pivot into alignment with the object surface as the vacuum cup is moved into engagement with the object surface due to the diameter of the pivot joint relative to the perimeter seal of the vacuum cup and/or due to the proximity of the pivot joint to the perimeter seal of the vacuum cup. The vacuum cups thus may pivot as they engage and align with the object, while an object sensor may be positioned at a generally central region of the vacuum cup to detect the proximity of the object and determine if the object is retained by the vacuum cups, and/or if more than one object is retained and lifted by the vacuum cups.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. A material handling device for engaging and moving an object, said material handling device being attachable to a support assembly that is configured to movably support said material handling device, said material handling device comprising:
    a vacuum cup having a perimeter seal for engaging and substantially sealing at an object surface, said vacuum cup being attached to a swivel member;
    an object sensor positioned at least partially within said vacuum cup and directed generally toward an object engaging end of said vacuum cup, said object sensor being operable to sense one of a thickness of an object at said vacuum cup and a proximity of an object at said vacuum cup;
    a receiving collar having an aperture for pivotally receiving said swivel member, said swivel member having an outer surface that movably engages an inner surface of said receiving collar to allow multi-axis pivoting of said swivel member relative to said receiving collar;
    a post fixedly attached to and extending from said receiving collar, said post being generally parallel to and spaced from a generally central axis of said aperture of said receiving collar;
    a mounting collar slidably attached to said post;
    a biasing element at least partially along said post, said biasing element biasing said mounting collar along said post and away from said receiving collar; and
    wherein said mounting collar is configured to attach to the support assembly, whereby movement of the support assembly moves said mounting collar and said post to move said vacuum cup toward and into engagement with an object, further movement of the support assembly after said vacuum cup is engaged with the object imparts movement of said mounting collar along said post and toward said receiving collar, said swivel member of said vacuum cup being pivotable within said receiving collar so that said vacuum cup pivots as said material handling device is moved toward an object having a non-level surface and thereby pivots to engage the object.

2. The material handling device of claim 1, wherein said outer surface of said swivel member has a diameter that is substantially similar to a diameter of said perimeter seal of said vacuum cup.

3. The material handling device of claim 2, wherein said swivel member is at a distance from said perimeter seal that is less than approximately one half of said diameter of said perimeter seal.

4. The material handling device of claim 1, wherein said object sensor is positioned at a generally central region of said vacuum cup.

5. The material handling device of claim 1, wherein said swivel member comprises a partially spherical outer surface that slidably engages a correspondingly formed inner surface of said receiving collar.

6. The material handling device of claim 1, wherein said biasing element is positioned at least partially within said post to bias or urge said mounting collar away from said receiving collar.

7. A material handling device for engaging and moving an object, said material handling device being attachable to a support assembly that is configured to movably support said material handling device, said material handling device comprising:
- a vacuum cup having a perimeter seal for engaging and substantially sealing at all object surface, said vacuum cup being attached to a swivel member;
- a receiving collar pivotally receiving said swivel member, said swivel member and said receiving collar engaging one another to allow multi-axis pivoting of said swivel member relative to said receiving collar, said receiving collar having a generally central axis therethrough;
- a post substantially fixedly attached to said receiving collar and extending from said receiving collar, said post being generally parallel to and spaced from said generally central axis of said receiving collar; and
- a mounting collar movably attached to said post and movable along said post, said post including a biasing element positioned at least partially along said post, said biasing element biasing said mounting collar away from said receiving collar, said mounting collar being configured to attach to the support assembly, whereby movement of the support assembly moves mounting collar, said post and said receiving collar toward an object to move said vacuum cup toward and into engagement with the object.

8. The material handling device of claim 7, wherein said swivel member comprises a partially spherical outer surface that slidably engages a correspondingly formed inner surface of said receiving collar, said outer surface of said swivel member having a diameter that is substantially similar to a diameter of said perimeter seal of said vacuum cup that engages the object.

9. The material handling device of claim 7, wherein said biasing element is positioned at least partially within said post to bias or urge said mounting collar away from said receiving collar.

10. The material handling device of claim 9, wherein said mounting collar engages said biasing element via an engaging member extending at least partially through said post.

11. The material handling device of claim 7 including an object sensing device positioned at least partially through said vacuum cup.

12. The material handling device of claim 11, wherein said object sensing device comprises a proximity sensor operable to sense the proximity of the object at said vacuum cup.

13. The material handling device of claim 11, wherein said object sensing device comprises a double blank detector operable to sense the thickness of the object at said vacuum cup.

14. The material handling device of claim 11, wherein said object sensing device is positioned at a generally central region of said vacuum cup.

15. The material handling device of claim 7, wherein said vacuum cup and said swivel member are pivotable about at least one generally horizontal axis when said receiving collar is in a generally horizontal orientation.

16. The material handling device of claim 7, wherein said swivel member comprises a partially spherical outer surface that slidably engages a correspondingly formed inner surface of said receiving collar.

17. The material handling device of claim 7, wherein said swivel member is at a distance from said perimeter seal that is less than approximately one half of a diameter of said perimeter seal.

* * * * *